United States Patent [19]

Mikami

[11] 4,283,513
[45] Aug. 11, 1981

[54] SILOXANE-MODIFIED EPOXY RESIN COMPOSITION

[75] Inventor: Ryuzo Mikami, Ichihara, Japan

[73] Assignee: Toray Silicone Company, Ltd., Tokyo, Japan

[21] Appl. No.: 126,238

[22] Filed: Mar. 3, 1980

[51] Int. Cl.³ ............... C08L 63/02; C08L 83/06
[52] U.S. Cl. .................. 525/476; 525/477; 525/523; 525/533; 528/27
[58] Field of Search .......................... 525/476

[56] References Cited

U.S. PATENT DOCUMENTS

| | | | |
|---|---|---|---|
| 3,055,858 | 9/1962 | Frye et al. | 528/15 |
| 3,088,847 | 5/1963 | Pines | 525/476 |
| 3,154,597 | 10/1964 | McWhorter | 525/523 |
| 3,170,962 | 2/1965 | Tyler | 525/524 |
| 3,358,064 | 12/1967 | Belko | 264/236 |
| 3,560,589 | 2/1971 | Sato et al. | 525/116 |
| 3,842,141 | 10/1974 | Fetscher et al. | 525/476 |
| 4,082,719 | 4/1978 | Liles et al. | 260/37 SB |
| 4,122,127 | 10/1978 | Mikami et al. | 525/477 |
| 4,141,926 | 2/1979 | Ariga et al. | 525/476 |

*Primary Examiner*—Wilbert J. Briggs, Sr.
*Attorney, Agent, or Firm*—James E. Bittell

[57] ABSTRACT

Compositions containing siloxane-modified epoxy resins, alkoxy functional organopolysiloxane and conventional epoxy curing agents are described which have improved resistance to degradation of electrical properties by boiling water and moisture. The compositions consist essentially of (A) siloxane-modified epoxy resin, (B) alkoxy functional organopolysiloxane such as polymethylmethoxysiloxane and (C) curing agents such as carboxylic acid anhydrides.

8 Claims, No Drawings

SILOXANE-MODIFIED EPOXY RESIN COMPOSITION

BACKGROUND OF THE INVENTION

This invention relates to siloxane-modified epoxy resin compositions with improved resistance to degradation by moisture and boiling water.

As described in U.S. Pat. No. 3,154,597, siloxane-modified epoxy resins which have both the excellent chemical resistance of epoxy resins and the excellent heat resistance of siloxane resins are known. One drawback of the siloxane-modified epoxy resins is the poor resistance of the cured compositions to degradation by boiling water and moisture. For example, when siloxane-modified epoxy resins are cured using conventional curing agents for epoxy resins, especially polyhydric carboxylic acids or their anhydrides, the electrical resistance of the composition decreases significantly when the composition is treated with boiling water.

One of the purposes of the present invention then is to improve the resistance to degradation by water of electrical properties of cured siloxane-modified epoxy resin compositions.

A companion application, Ser. No. 126,231, allowed, by the same inventor with the same filing date and assigned to the same assignee describes siloxane-modified epoxy resin compositions with improved resistance to degradation by boiling water and moisture of both adhesion to inorganic substrates and electrical resistance. In addition to the siloxane-modified epoxy resin and curing agent, the compositions contain an epoxy, methacryl, or amino organofunctional alkoxysilicon compound.

SUMMARY OF THE INVENTION

It has been found that the addition of an organopolysiloxane which contains at least one alkoxy group to compositions containing siloxane-modified epoxy resins and curing agent improves the resistance to degradation by boiling water and moisture in the cured compositions. This invention relates to a siloxane-modified epoxy resin composition consisting essentially of (A) 100 parts by weight of a siloxane-modified epoxy resin prepared by reacting (1) 5 to 70 parts by weight of an alkylphenylpolysiloxane of the general unit formula

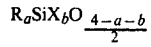

wherein R is selected from the group consisting of alkyl radicals and phenyl radicals such that the ratio of alkyl radicals to phenyl radicals in the alkylphenylpolysiloxane is 0.3 to 3.0, X is an alkoxy radical or a hydroxyl radical, a is 0.9 to 1.8 and b is 0.01 to 2 with (2) 95 to 30 parts by weight of an epoxy resin having at least two epoxy groups per molecule, (B) 0.01 to 30 parts by weight of an alkoxy group containing organopolysiloxane of the general unit formula

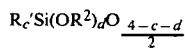

wherein R' is selected from the group consisting of monovalent hydrocarbon radicals and halogen substituted monovalent hydrocarbon radicals, $R^2$ is an alkyl radical, c is 0.9 to 1.8 and d is 0.01 to 2 and (C) a curing agent for (A).

DETAILED DESCRIPTION OF THE INVENTION

The siloxane-modified epoxy resin (A) employed in the invention is prepared by reacting (1) an alkylphenylpolysiloxane with (2) an epoxy resin.

The alkylphenylpolysiloxanes employed in the preparation of resin (A) must have functional groups which are capable of reacting with the functional groups of the epoxy resin. Suitable alkylphenylpolysiloxanes then must have hydroxyl radicals or alkoxy radicals which are bound to silicon atoms. The preferred alkylphenylpolysiloxanes have 0.01 to 2 of these functional groups per silicon atom in the siloxane.

The organic radicals bound to the silicon atoms of the alkylphenylpolysiloxanes are alkyl radicals and phenyl radicals. Suitable alkyl radicals include the methyl, ethyl, propyl, butyl and octadecyl radicals. It is important that the ratio of alkyl radicals to phenyl radicals in the polysiloxane be in the range of 0.3 to 3.0. If the molar ratio of alkyl radicals to phenyl radicals in the polysiloxane is too low, the siloxane-modified epoxy resin prepared from that polysiloxane is undesirably brittle. On the other hand, if the ratio is too high, it is difficult to carry out the modification reaction with the epoxy resin.

In addition, the average number of organic radicals per silicon atom for the polysiloxane should be in the range of 0.9 to 1.8. Siloxane-modified epoxy resin prepared from a polysiloxane containing less than 0.9 organic radicals per silicon atom is too brittle while resin prepared from a polysiloxane containing greater than 1.8 organic radicals per silicon atom is too soft.

Suitable alkylphenylpolysiloxanes can be produced by conventional methods. For example, the alkylphenylpolysiloxanes can be produced by the co-hydrolysis and co-condensation of the corresponding halo or alkoxy silanes.

The epoxy resins which are reacted with the alkylphenylpolysiloxanes are common epoxy resins having at least two epoxy groups per molecule. Examples of these epoxy resins are as follows: polyglycidyl esters, polyglycidyl ethers which are obtained by base catalyzed reaction of epichlorohydrin with aromatic polyhydric phenols such as bisphenol A, bisphenol F, halogenated bisphenol A, catechol, resorcinol, methylresorcinol and novalak resins and aliphatic polyhydric alcohols such as glycerol, ethylene glycol and neopentyl glycol and epoxidized polyolefins such as epoxidized polybutadienes and epoxidized soybean oil. The preferred epoxy resins for the present invention are the polydiglycidyl ethers of bisphenol A with a molecular weight of 340 to 6000. Such epoxy resins are commercially available as Epon TM 828, Epon TM 1001 and Epon TM 1004 from the Shell Chemical Company.

The siloxane-modified epoxy resins can be produced by reacting the above-described alkylphenylpolysiloxanes with the epoxy resins according to the methods specified in U.S. Pat. No. 3,154,597 which is hereby incorporated by reference, Japanese Patent No. Sho 29[1954]-8695, and Japanese Pat. No. Sho 29[1954]-8697. For example, the alkylphenylpolysiloxane can be reacted with the epoxy resin by heating the combined materials at about 120° to 210° C. If desirable, a solvent such as toluene, xylene, acetic acid esters and various ketones can be employed to reduce the viscosity of the reaction composition. In addition, catalysts such as alkyl titanates, p-toluenesulfonic acid and organic carboxylic acids can be employed to facilitate the reaction.

Generally, 5 to 70 parts by weight of the alkylphenylpolysiloxane can be reacted with 95 to 5 parts by weight of the epoxy resin to prepare siloxane-modified epoxy resins useful in the present invention. If a lower amount of alkylphenylpolysiloxane is employed, the heat resistance of the resulting resin is not significantly improved, while if higher amounts are employed, the mechanical strength of the cured composition is reduced. Preferably, 15 to 50 parts by weight of the alkylphenylpolysiloxane is reacted with 85 to 50 parts by weight of the epoxy resin.

The alkoxy group containing organopolysiloxane (B) employed in the compositions of this invention is an important constituent which imparts moisture and boiling water resistance to the cured siloxane-modified epoxy resin. Suitable organopolysiloxanes have the general formula

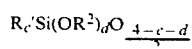

in which R' is a monovalent hydrocarbon radical or a halogen substituted monovalent hydrocarbon radical, $R^2$ is an alkyl radical, c is 0.9 to 1.8 and d is 0.01 to 2.

Examples of the R' substituents include monovalent hydrocarbon radicals such as alkyl radicals such as methyl, ethyl, propyl, butyl, 2-ethylhexyl and octadecyl, alkenyl radicals such as vinyl, allyl, decenyl and hexadienyl, cycloalkyl radicals such as cyclopentyl and cyclohexyl, cycloalkenyl radicals such as cyclopentenyl, cyclohexenyl and cyclo-2,4-hexadienyl, aryl radicals such as phenyl and naphthyl, aralkyl radicals such as benzyl and phenylnaphthyl, alkaryl radicals such as tolyl and dimethylphenyl and halogenated monovalent hydrocarbon radicals. Alkyl radicals, vinyl radicals and phenyl radicals are preferred.

Examples of the $R^2$ substituents are alkyl radicals such as methyl, ethyl, propyl and butyl.

The organopolysiloxanes (B) can be produced by partial hydrolysis and condensation of the corresponding organoalkoxysilanes by heating in the presence of water and an acid or alkaline catalyst.

The organopolysiloxane (B) is preferably employed in the compositions of the invention in such an amount that it is compatible with the siloxane-modified epoxy resin. The amount of organopolysiloxane (B) that is compatible with the siloxane-modified epoxy resin depends upon the molecular weight of (B) and the types of organic substituents on the silicon atoms. Generally, the amount of (B) employed is in the range of 0.01 to 30 parts by weight (B) to 100 parts by weight of the siloxane-modified epoxy resin (A). If the amount of (B) employed is below this range, satisfactory moisture and boiling water resistance is not obtained while the use of an amount above the range usually results in poor compatibility. Preferably, the amount of (B) employed is in the range of 0.3 to 20 parts by weight per 100 parts by weight (A).

Curing agent (C) is employed in the compositions of this invention to cure the siloxane-modified epoxy resin. Curing agents which are commonly used for epoxy resins can be used without any modifications. Conventional curing agents for epoxy resins include organic compounds having amino groups, carboxyl groups, carboxylic anhydride groups, hydroxyl groups, —SH groups, —NCO groups, —NCS groups or CONH— groups, organometallic compounds, Lewis acids, organic mineral acid esters, or titanium, zinc, boron or aluminum compounds containing organic groups. In addition, other acidic or basic compounds are also applicable.

Examples of these compounds are as follows: aliphatic polyamines such as ethylenediamine, diethylenetriamine, triethylenetetramine, dipropylenetriamine, dimethylaminopropylamine, diethylaminopropylamine and cyclohexylaminopropylamine, aliphatic hydroxylmonoamines such as monoethanolamine, diethanolamine, propanolamine and N-methylethanolamine, aliphatic hydroxyl-polyamines such as aminoethylethanolamine, monohydroxyethyldiethylenetriamine, bishydroxyethyldiethylenetriamine, and N-(2-hydroxypropyl)ethylenediamine, aromatic amines such as aniline, toluidine, ethylaniline, xylidine, benzidine, 4,4'-diaminodiphenylmethane, 2,4,6-tri(dimethylaminomethyl)phenol, 2,2-bis(4-aminophenyl)propane, 4,4'-diaminodiphenyl ether, 4,4'-diaminodiphenyl sulfone, 4,4'-diaminobenzophenone, 2,2'-dimethyl-4,4'-diaminodiphenylmethane, 2,4'-diaminobiphenyl, 3,3'-dimethyl-4,4'-diaminobiphenyl and 3,3'-dimethoxy-4,4'-diaminobiphenyl, aliphatic amines having a cyclic structure such as piperidine, N-aminoethylpiperidine and triethylenediamine, polyhydric carboxylic acids such as phthalic acid, maleic acid, trimellitic acid, pyromellitic acid, tetrahydrophthalic acid, hexahydrophthalic acid, tetrachlorophthalic acid, dodecenylsuccinic acid, endomethylenephthalic acid, methylendomethylenephthalic acid, hexachloromethylene tetrahydrophthalic acid and chloromaleic acid and their acid anhydrides. Other examples of nitrogen-containing curing agents are dicyandiamide, guanidine, NCO-group-containing polyurethane resin prepolymer, and urea resin primary condensation product. In addition, titanium, zinc, boron and aluminum compounds containing organic groups, i.e. tetrabutyl titanate, dibutyltin dilaurate, Cu[Al(C$_4$H$_9$O)$_4$]$_2$, stannous octoate, zinc octoate, cobalt naphtholate, may also be applicable. In particular, polyhydric carboxylic acids or their acid anhydrides are preferred.

The amount of curing agent (C) employed in the compositions of the present invention varies significantly depending upon the type of curing agent selected. Generally, the amount of curing agent to be employed, can be calculated roughly as one equivalent curing agent based on the groups subject to reaction in the curing agent per equivalent siloxane-modified epoxy resin based on the groups subject to reaction in the resin. However, the optimal amount of curing agent may fluctuate considerably from this calculated equivalent value. Therefore, the optimum amount of curing agent for any particular composition is best determined by a few initial experiments.

In addition to the above-mentioned components (A), (B) and (C), various additives can be included in the compositions of this invention. Examples of these additives are: inorganic pigments, organic pigments, antimony oxide, silica, silica powder, glass fiber, clay, mica, aluminum powder. When the siloxane-modified epoxy resins are produced, an organic solvent can be used as mentioned previously. The siloxane-modified epoxy resins still containing the above-mentioned organic solvent can be used in the composition of this invention, or a fresh organic solvent can be added. In addition, the following silane coupling agents can be added in order to improve adhesion to inorganic materials:

$H_2NCH_2CH_2NH(CH_2)_3Si(OCH_3)_3$,

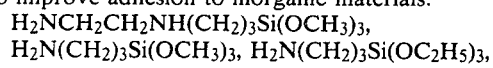

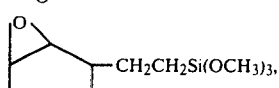

The following examples are presented for illustrative purposes and should not be construed as limiting the invention set forth in the claims. Unless otherwise specified, "parts" and "percent" as used in the following examples imply "parts by weight" and "percent by weight", respectively.

EXAMPLE 1

A polydiglycidyl ether of bisphenol A epoxy resin with an epoxy equivalent weight of 450-550, Epon TM 1001 from Shell Chemical Co. (112.5 parts), methylphenylpolysiloxane with a molecular weight of approximately 1600 and an average composition of $(CH_3)_{0.35}(C_6H_5)_{0.70}(OH)_{0.28}SiO_{1.33}$ (37.5 parts), 2-ethylhexanoic acid (2 parts) and ethylene glycol monoethyl ether acetate (100 parts) were placed in a 500 ml four-necked flask which was equipped with a distilling tube, a condenser, a stirring device and a thermometer. The mixture was slowly heated to 150°-155° C. Water produced as a by-product was distilled out of the reaction system during the reaction. Samples of the reaction mixture were occasionally removed and placed on a glass plate. The reaction was continued until a transparent film was obtained on the glass plate after evaporating the solvent. The reaction time required was 8 hours. After a transparent film was obtained, the temperature was lowered to 120° C. and ethylene glycol monoethyl ether acetate (50 parts) was added. As a result, a siloxane-modified epoxy resin solution with a solids content of 50% was obtained.

Subsequently, $CH_3Si(OCH_3)_3$ was hydrolyzed and condensed using an acid catalyst in the presence of water. Polymethylmethoxysiloxane with a viscosity of 69.5 cSt ($6.95 \times 10^{-5} m^2 s^{-1}$) and a methoxy group content of 34.4 percent was obtained.

The polymethylmethoxysiloxane was added in the various amounts shown in Table I to a mixture of 100 parts (solids content) of the above-mentioned siloxane-modified epoxy resin and 12 parts of trimellitic anhydride as a curing agent to provide coating compositions for comparison. Each composition was coated at a thickness of approximately 100 μm on an aluminum test panel with the dimensions $100 \times 100 \times 0.3$ mm. The coated film was baked at 150° C. for 60 minutes.

The physical properties of the cured film were determined. The volume resistivity test was conducted according to JIS-C-2122. The checkerboard adhesion test consisted of cutting a grid of lines in the coating to produce 100 squares (1 mm$^2$) in an area 10 mm $\times$ 100 mm on the plate. Cellophane tape was applied to the squares with pressure and then peeled off. The degree of adhesion was expressed as the number of aquares which remained on the plate out of the original 100 squares.

As shown in Table I, when the amount of polymethylmethoxysiloxane was increased considerably (40 parts), it was not compatible with the siloxane-modified epoxy resin. The resulting film became significantly tacky and lost its transparency. The volume resistivity after the treatment with boiling water for two hours decreased significantly compared to the value before the treatment when only a small amount of polymethylmethoxysiloxane or no polymethylmethoxysiloxane was added. This indicates that the boiling water resistance was poor. On the other hand, the boiling water resistance was found to be improved significantly by the addition of polymethylmethoxysiloxane according to the present invention.

TABLE 1

|  |  | Example | Comparative Examples | | |
|---|---|---|---|---|---|
| Components | Silicone-modified epoxy resin (solids content) (parts) | 100 | 100 | 100 | 100 |
|  | Polymethylmethoxysiloxane (parts) | 2.0 | 0 | 0.004 | 40 |
|  | Trimellitic anhydride (parts) | 12 | 12 | 12 | 12 |
|  | Appearance of coated film | Transparent | Transparent | Transparent | Whitening (tackiness) |
|  | Pencil hardness | 2 H | 2 H | 2 H |  |
|  | Adhesion (checkerboard test) | 100/100 | 100/100 | 100/100 |  |
| Physical properties of cured film | Volume resistivity (Ω·cm) in the initial state (before treatment) | $8.4 \times 10^{16}$ | $6.3 \times 10^{16}$ | $7.0 \times 10^{16}$ |  |
|  | After treatment with boiling water for 2 hours | $1.7 \times 10^{15}$ | $1.7 \times 10^{11}$ | $2.0 \times 10^{11}$ |  |

EXAMPLE 2

The epoxy resin employed in Example 1, (105 parts), methylphenylpolysiloxane with a molecular weight of approximately 2300 and an average composition of $(CH_3)_{0.83}(C_6H_5)_{0.41}(OH)_{0.25}SiO_{1.25}$ (45 parts), 2-ethylhexanoic acid (2 parts) and ethylene glycol monoethyl ether acetate (100 parts) were placed in a 500 ml four-necked flask which was equipped with a distilling tube, a condenser, a stirring device and a thermometer and the mixture was slowly heated to 150°–155° C. The reaction was continued for 9 hours. Samples of the reaction mixture were occasionally taken and placed on a glass plate during the reaction. The reaction was continued until a transparent film was obtained on the glass plate after evaporating the solvent. After the reaction, the temperature was lowered to 120° C. Additional ethylene glycol monoethyl ether acetate (50 parts) was added. As a result, a siloxane-modified epoxy resin with a solids content of 50 percent was obtained. Three different compositions were prepared by adding the polymethylmethoxysiloxane used in Example 1 in the various amounts shown in Table II, to a mixture of 100 parts (solids content) of the siloxane-modified epoxy resin, 24 parts of hexahydrophthalic anhydride as a curing agent and 0.46 parts of tin octoate as a reaction accelerator.

The resulting compositions were coated at a thickness of approximately 100 μm on an aluminum test panel with the dimensions 100×100×0.3 mm and the coated film was baked at 150° C. for 60 minutes. The same tests were conducted as in Example 1. The results obtained are presented in Table II.

TABLE II

|  |  | Example |  | Comparison Example |
|---|---|---|---|---|
| Components | Silicone-modified epoxy resin (solids content) (parts) | 100 | 100 | 100 |
|  | Polymethylmethoxysiloxane (parts) | 1.0 | 3.0 | 0 |
|  | Hexahydrophthalic anhydride (parts) | 24 | 24 | 24 |
|  | Tin octoate (parts) | 0.46 | 0.46 | 0.46 |
|  | Appearance of coated film | Transparent | Transparent | Transparent |
|  | Pencil hardness | 2 H | 2 H | 2 H |
|  | Adhesion (checkerboard test) | 100/100 | 100/100 | 100/100 |
| Physical properties of cured film | Volume resistivity (Ω · cm) in initial state (before treatment) | $7.6 \times 10^{16}$ | $7.8 \times 10^{16}$ | $6.9 \times 10^{16}$ |
|  | After treatment with boiling water for 2 hours | $1.8 \times 10^{15}$ | $1.9 \times 10^{15}$ | $1.6 \times 10^{13}$ |

That which is claimed is:

1. A siloxane-modified epoxy resin composition consisting essentially of (A) 100 parts by weight of a siloxane-modified epoxy resin prepared by reacting (1) 5 to 70 parts by weight of an alkylphenylpolysiloxane of the general unit formula $$R_a SiX_b O_{\frac{4-a-b}{2}}$$

wherein each R is an alkyl or a phenyl radical such that the ratio of alkyl radicals to phenyl radicals in the alkylphenylpolysiloxane is 0.3 to 3.0, X is an alkoxy radical or a hydroxyl radical, a is 0.9 to 1.8, and b is 0.01 to 2 with (2) 95 to 30 parts by weight of an epoxy resin having at least two epoxy groups per molecule, (B) 0.01 to 30 parts by weight of an alkoxy group containing organopolysiloxane of the general unit formula $$R_c' Si(OR^2)_d O_{\frac{4-c-d}{2}}$$

wherein R' is selected from the group consisting of monovalent hydrocarbon radicals and halogen substituted monovalent hydrocarbon radicals, $R^2$ is an alkyl radical, c is 0.9 to 1.8 and d is 0.01 to 2 and (C) a curing agent for (A).

2. A siloxane-modified epoxy resin composition according to claim 1 in which epoxy resin (2) is a polydiglycidyl ether of bisphenol A resin with a molecular weight of 340 to 6000.

3. A siloxane-modified epoxy resin composition according to claim 1 in which siloxane-modified epoxy resin (A) is prepared by reacting 15 to 50 parts by weight (1) with 85 to 50 parts by weight (2) at about 120° to 210° C.

4. A siloxane-modified epoxy resin composition according to claim 1 containing 0.3 to 20 parts by weight of (B).

5. A siloxane-modified epoxy resin composition according to claim 4 in which (B) is a polymethylmethoxysiloxane containing an average of 1 methoxy radical per silicon atom.

6. A siloxane-modified epoxy resin composition according to claim 5 in which curing agent (C) is selected from the group consisting of polyhydric carboxylic acids and polyhydric carboxylic acid anhydrides.

7. A siloxane-modified epoxy resin composition according to claim 6 in which the curing agent (C) is trimellitic anhydride.

8. A siloxane-modified epoxy resin composition according to claim 6 in which the curing agent (C) is hexahydrophthalic anhydride.

* * * * *

UNITED STATES PATENT AND TRADEMARK OFFICE
CERTIFICATE OF CORRECTION

PATENT NO. : 4,283,513
DATED : August 11, 1981
INVENTOR(S) : Ryuzo Mikami

It is certified that error appears in the above-identified patent and that said Letters Patent are hereby corrected as shown below:

In Column 6, line 23; the line reading "produce 100 squares (1 $mm^2$) in an area 10 mm x 100" should read "produce 100 squares (1 $mm^2$) in an area 10 mm x 10"

Signed and Sealed this

Twenty-ninth Day of December 1981

[SEAL]

Attest:

GERALD J. MOSSINGHOFF

Attesting Officer — Commissioner of Patents and Trademarks